United States Patent Office 3,485,809
Patented Dec. 23, 1969

3,485,809
ACRYLIC RESINS
Jean-Pierre Robert, Villemoisson-sur-Orge, France, assignor to Ugine Kuhlmann, Paris, France, a French company
No Drawing. Filed Jan. 4, 1967, Ser. No. 607,155
Claims priority, application France, Jan. 6, 1966, 45,034
Int. Cl. C08f *15/36, 3/64*
U.S. Cl. 260—86.1        12 Claims

ABSTRACT OF THE DISCLOSURE

Aryl halogenophosphate and alkyl halogenophosphate can be used as a catlayst activator and as a decoloring agent, respectively for the polymerization of acrylic monomers.

BACKGROUND OF THE INVENTION

Field of the invention

This invention relates to acrylic resins and more particularly to a process for polymerizing acrylic monomers using an organic peroxide as a catalyst and aryl halogenophosphate and akylhalogenophosphate as an activator and a decoloring agent, respectively. The invention also relates to a novel polymerization composition containing these novel activators and decoloring agents and the resultant polymerized product.

Description of the prior art

Bulk polymerization of monomers of acrylic and methacrylic esters has been carried out using an organic peroxide as a catalyst. The polymerization is accompanied by the evolution of considerable amounts of heat. Unless this heat is able to diffuse from the polymerizing mass during the process, the temperature will rise rapidly and cause the monomer to boil. This in turn, will cause a faulty casting full of bubbles and defects. Polymerization at atmospheric pressures, therefore, requires very careful control to obtain a flawless casting, and one dimension of the casting must be kept to a minimum. Casting of thicker cross section can be accomplished only by polymerizing at high pressures in autoclaves. Under pressure, high temperatures can be used to shorten the casting cycle.

Polymerization at ambient temperature has economic advantage and is capable of producing castings of improved quality. The casting cycle, however, is long, due to low peroxide reactivity at the ambient temperature. Activators or promotors, therefore are required to increase the reactivities of the peroxide catalyst. The term "ambient temperature" used herein, refers to the surrounding temperature normally encountered in the laboratories and plants for the production of acrylic resins.

Among the various chemical compounds that are likely to increase the decomposition of peroxides at ambient temperature, thereby increasing the polymerization rate, I have tried to use the amines, mercaptans, cobalt octoate, and the quanternary ammonium salts. None of these compounds, however, are completely satisfactory. Their deficiencies include lack of reactivity and parasitic colorations transferable to the product.

SUMMARY OF THE INVENTION

I have found that aryl halogenophosphates and alkyl halogenophosphates are excellent activators and decoloring agents for the polymerization of acrylic resins. The two types of compounds acting in a synergistic manner, promote rapid polymerization without the introduction of undesirable coloration in the resultant products. Broadly stated, the process of this invention comprises the initial preparation of a prepolymer syrup containing a monomer or a mixture of monomers selected from the group consisting of (I) acrylic monomers of the general structure:

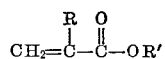

wherein R is H or a methyl radical and R' is a lower alkyl, and (II) organic compounds copolymerizable with the acrylic monomers. The syrup contains at least one monomer of group (I). An organic peroxide in combination with an activator selected from the group consisting of aryl halogenophosphates and a decoloring agent selected from the group consisting of alkyl halogenophosphates, are then added to the syrup to form a polymerizable mixture. The mixture is cast to form a polymerized solid mass.

DESCRIPTION OF THE PREFERRED EMBODIMENTS

The suitable organic peroxides for the catalytic polymerization of acrylic resins are well known. I found lauryl peroxide, benzoyl peroxide, 2,4-dichlorobenzoyl peroxide, parachlorobenzoyl peroxide, cyclohexanone peroxide and methyl-ethyl-ketone peroxide to be eminently suitable. The amount of peroxide used in the process may vary within a wide range. An amount in the range of 0.05% to 5% and preferably 0.05 to 2% by weight based on the mass of the product is adequate.

The amount of the activator and decoloring agent to be used in the present process, depends on the peroxide and the composition of the prepolymer syrup. Generally, the activator used falls within the range of 0.05% to 2% by weight based on the acrylic monomer or monomers in the syrup. The amount of decoloring agent used may be calculated in accordance with the activator used. A range of 50%–200% by weight of the activator gives the best resuls.

Among the aryl halogenophosphates and alkyl halogenophosphates that can be used as synergistic additives to the prepolymer syrup, I found phenyl dichlorophosphate and trichloroethyl phosphate, to be particularly suitable. Using phenyl dichlorophosphate as an activator, the amount to be added to the syrup may range, for example, from 0.1%–2% for syrup containing monomer of methyl methacrylate and 0.05%–1% for syrup containing a mixture of monomer of methyl methacrylate and 30% by weight of dissolved methyl polymethacrylate. The amount of trichloroethyl phosphate to be used is within the range of 50%–200% based on the weight of phenyl dichlorophosphate used. The amount of decoloring agent used influences the quality of the product, particularly its optical quality.

The process of this invention has a number of advantages. The most important one is that the process may be carried out at an ambient temperature without the necessity of usual heating apparatus and at a normal production rate. The process is particularly suitable for polymerizing monomers of acrylic and methacrylic esters, which may be used alone or in the form of a mixture to form a copolymer. Monomers that are copolymerizable with the acrylic monomers may also be used in combination therewith. The copolymerizable monomers include, for example, vinyl chloride, vinyl acetate, vinylidene chloride, vinyl pyridine, butadiene and other dienes, acrylic and methacrylic acids, styrenes, acrylonitrile, etc. In addition to the peroxide catalyst and the synergistic combination of aryl halogenophosphate and alkyl halogenophosphate, additional additives may be added. They include for example, plasticizers and cross-linking agents.

Further to illustrate this invention, specific examples are described hereinbelow. The examples will demonstrate to one skilled in the art, how to choose an adequate formula, catalyst-activator and decolorant, in order to achieve the desired results. The examples will also show the complementary action of the two additives of this invention. In one case, the use of a relatively larger amount of aryl halogenophosphate causes an increasing degree of yellowing of the product and in the second case, the use of a relatively larger amount of alkyl halogenophosphate, reduces the reaction speed. The examples will further demonstrate the advantages of using a relatively small amount of aryl halogenophosphate in combination with a mercaptan. The latter compound serves as a complementary activator to compensate for the smaller amount of aryl halogenophosphate used so the reaction speed is not greatly changed.

Example 1.—These tests were conducted with prepolymer syrups prepared by disolving methyl polymethacrylate powder having an average molecular weight in the destabilized monomer range of methyl methacrylate. The syrup contained 30% of polymer and its viscosity was 14 poises at 20° C.

In the first test, the activating effect of phenyl dichlorophosphate with and without lauryl mercaptan was observed. The polymerizing catalyst was methyl-ethyl-ketone peroxide dissolved in dibutyl phthalate to form a 50% solution. The resultant prepolymer mixture with the different additives was used to prepare cubes of about 100 cubic centimeters by polymerizing at an ambient temperature (23° C.). The casts were protected from the inhibition of oxygen, either by carrying out the polymerization in a nitorgen atmosphere, or by covering the casts with cellophane film. The results are tabulated hereinbelow:

TABLE I

| Weight of Syrup | Methyl-ethyl ketone peroxide, percent | Lauryl mercaptan, percent | Phenyl dichlorophosphate, percent | Polymerization duration, hrs. | Appearance of the polymers |
|---|---|---|---|---|---|
| 100 g | 1 | 0.3 | 0 | (*) | |
| 100 g | 1 | 0 | 0.5 | 7 | Slightly yellow. |
| 100 g | 1.5 | 0.5 | 0.5 | 2 | Strong reaction, yellow, bubbles. |
| 100 g | 1 | 0.3 | 0.1 | 10–18 | Colorless, transparent. |
| 100 g | 1 | 0.3 | 0.2 | 7 | Slightly yellow. |
| 100 g | 1 | 0.3 | 0.5 | 4 | Yellow, many bubbles. |

*No polymerization for 48 hrs.

The following conclusions can be made based on the test results:

(1) Phenyl dichlorophosphate permits the polymerization at an accelerated rate which increases with increasing amount. The resultant polymers however, showed a tendency to become increasingly yellow.

(2) The presence of lauryl mercaptan permits the acceleration of the reaction in the presence of phenyl dichlorophosphate.

(3) The yellow coloration of polymers increases with the increasing percentage of peroxide catalyst.

Example 2.—With the same syrup as in Example 1, and under the same polymerizing conditions, the conjugated effect of phenyl dichlorophosphate and trichloroethyl phosphate in the absence of lauryl mercaptan were studied. The results are tabulated hereinbelow:

TABLE II

| Weight of Syrup | Methyl-ethyl ketone peroxide, percent | Phenyl dichlorophosphate, percent | trichloroethyl phosphate, percent | Polymerization duration, hrs. | Appearance of the polymers |
|---|---|---|---|---|---|
| 100 g | 1 | 0.5 | 0.2 | 8 | Yellow. |
| 100 g | 1 | 0.5 | 0.5 | 10 | Slightly yellow. |
| 100 g | 1 | 0.5 | 1 | 18 | Practically colorless. |

The tabulated results show that the trichlohoethyl phosphate lessens appreciably the yellow coloration produced by the phenyl dichlorophosphate, but it also lessens appreciably the reaction speed.

Example 3.—The test was conducted under the same conditions and with the same syrup as in Example 1, and in addition the following were added to the syrup:

| | Percent |
|---|---|
| Methylethyl ketone peroxide at 50% in butyl phthalate | 1 |
| Lauryl mercaptan | 0.3 |
| Phenyl dichlorophosphate | 0.1 |
| Trichloroethyl phosphate | 0.1 |
| Ethylene glycol dimethacrylate as a cross-linking agent | 2 |

The resultant polymers were practically colorless and the presence of the cross-linking agent did not disturb the polymerization.

Example 4.—The test was carried out the same as in Example 1, starting with 100 g. of methyl methacrylate to which the following were added:

| | Percent |
|---|---|
| Methyl ethyl ketone peroxide at 50% in butyl phthalate | 1 |
| Phenyl dichlorophosphate | 0.1 |
| Trichloroethyl phosphate | 0.1 |
| Lauryl mercaptan | 0.3 |

After polymerizing at the ambient temperature for 36 hours, polymers of colorless methyl polymethacrylate were obtained.

Example 5.—The polymerization was carried out for 30 hours at 20° C. using a mixture of monomers consisting of:

| | Parts |
|---|---|
| Methyl methacrylate | 80 |
| Dimethyl itaconate | 20 | to which the following were added:

| | Percent |
|---|---|
| Phenyl dichlorophosphate | 0.1 |
| Trichloroethyl phosphate | 0.1 |
| Lauryl mercaptan | 0.3 |

A transparent and colorless polymer was obtained.

Example 6.—The polymerization was carried out for 36 hours at 20° C. using a mixture of monomers consisting of:

| | Parts |
|---|---|
| Methyl methacrylate | 70 |
| Diallyl phthalate | 30 | to which the following were added:

| | Percent |
|---|---|
| Phenyl dichlorophosphate | 0.1 |
| Trichloroethyl phosphate | 0.1 |
| Lauryl mercaptan | 0.3 |
| Methyl-ethyl-ketone peroxide at 50% in dibutyl phthalate | 1 |

A transparent and colorless polymer was obtained.

Example 7.—The polymerization was carried out for 10 hours at 20° C. using a mixture consisting of:

| | Parts |
|---|---|
| Dimethyl itaconate | 10 |
| A syrup of monomeric methyl methacrylate comprising 30% of methyl polymethacrylate with an average molecular weight | 90 | to which the following were added:

| | Percent |
|---|---|
| Phenyl dichlorophosphate | 0.1 |
| Trichloroethyl phosphate | 0.1 |
| Lauryl mercaptan | 0.3 |
| Methyl-ethyl-ketone peroxide at 50% in dibutyl phthalate | 0.6 |

A hard, transparent and colorless polymer was obtained.

I claim:

1. A polymerization process which comprises preparing a syrup containing a polymerizable acrylic ester monomer, adding to said syrup an organic peroxide catalyst, an aryl chloro-phosphate activator for said catalyst and a decoloring agent comprising a chlorinated alkyl phosphate to form a polymerizable mixture, and polymerizing said mixture to form a polymerized solid mass.

2. The process of claim 1 in which the acrylic ester monomer is selected from the group consisting of acrylic esters or methyl acrylic esters.

3. The process of claim 2 in which the acrylic ester monomer has dissolved therein an acrylic polymer.

4. The process of claim 1 in which the acrylic ester monomer has dissolved therein an acrylic ester polymer.

5. The process of claim 4 in which an organic compound copolymerizable with the acrylic ester monomer is added to the syrup prior to polymerizaton and copolymerized with the acrylic ester polymer.

6. The process of claim 1 in which an organic compound copolymerizable with the acrylic ester monomer is added to the syrup prior to polymerization and copolymerized with the acrylic ester.

7. The process of claim 1 in which a mercaptan is added to the syrup prior to polymerization.

8. The process of claim 4 in which a mercaptan is added to the syrup before polymerization.

9. The process of claim 1 in which the activator is phenyl dichloro-phosphate and the decoloring agent trichloroethyl phosphate.

10. The process of claim 4 in which the activator is phenyl dichloro-phosphate and the decoloring agent is trichloroethyl phosphate.

11. The process of claim 1 in which the activator is present in the syrup in an amount from about 0.05% to 2% by weight of the acrylic ester monomer and the decoloring agent in the syrup is present in an amount from about 50% to 200% by weight of the activator.

12. The process of claim 11 in which the organic peroxide is present in the syrup in an amount of about 0.05% by weight.

References Cited
UNITED STATES PATENTS

| | | | |
|---|---|---|---|
| 2,101,061 | 12/1937 | Gordon | 260—89.5 |
| 3,160,618 | 12/1964 | DeLacretaz. | |
| 3,355,418 | 11/1967 | Oldsberg. | |
| 3,380,980 | 4/1968 | Calkins et al. | |

HARRY WONG, JR., Primary Examiner

U.S. Cl. X.R.

260—89.5, 86.3, 83.5, 86.7, 85.5, 78.5, 31.8, 885